July 28, 1931.                L. J. STACY              1,816,621
                             TESTING SYSTEM
                           Filed Aug. 4, 1927
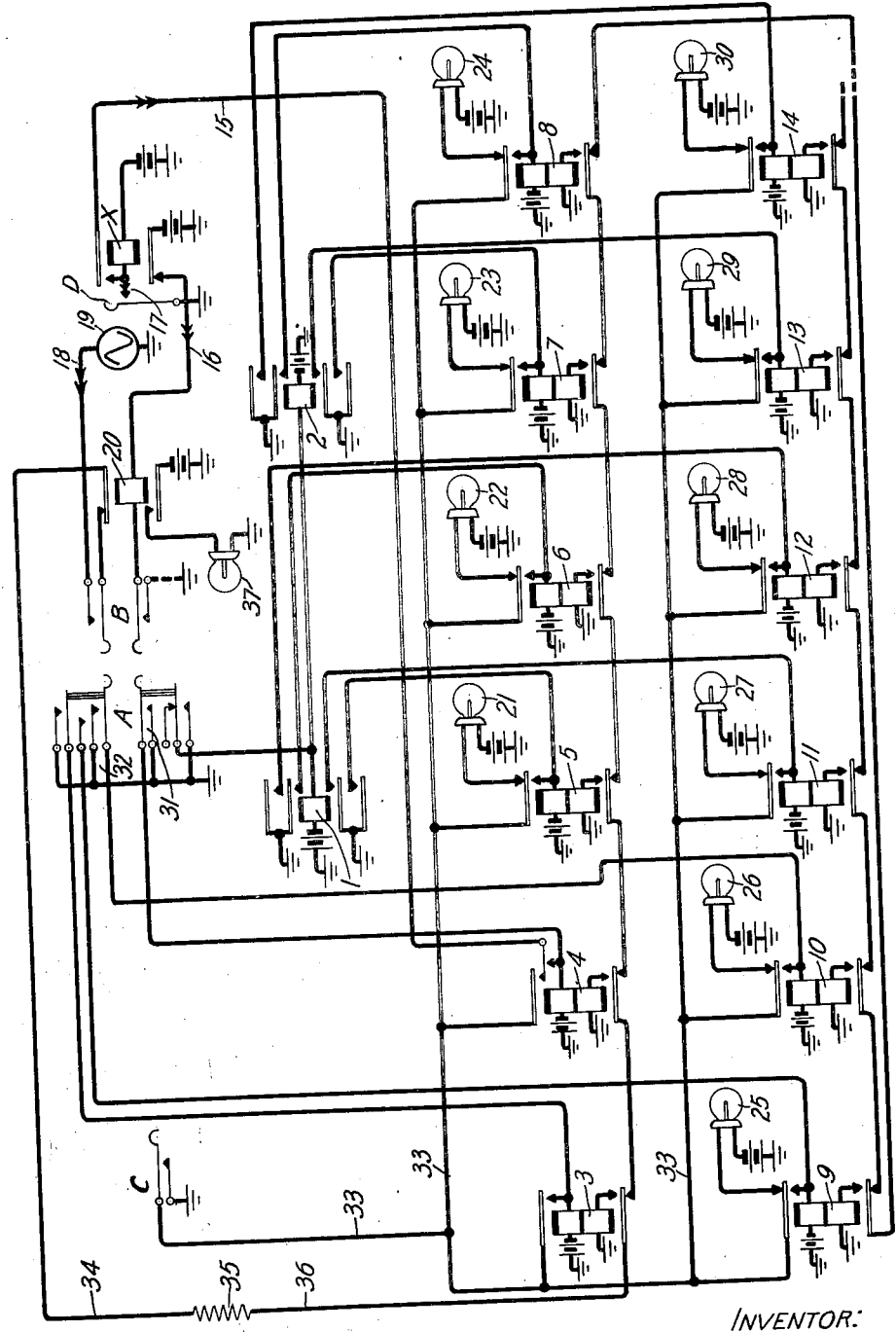
INVENTOR:
LELAND J. STACY
BY P. C. Smith
         ATTORNEY Patented July 28, 1931

1,816,621

UNITED STATES PATENT OFFICE

LELAND J. STACY, OF CALDWELL, NEW JERSEY, ASSIGNOR TO BELL TELEPHONE LABORATORIES, INCORPORATED, OF NEW YORK, N. Y., A CORPORATION OF NEW YORK

TESTING SYSTEM

Application filed August 4, 1927. Serial No. 210,536.

This invention relates to a testing system and more particularly to a system employing a train of relays responsive to successive half waves of current from an alternating current source.

In signaling systems and particularly telephone systems it is often desirable to measure time intervals exactly, as for example, in testing relays to measure the time required for a relay to completely energize or to completely release; for measuring predetermined time intervals, for example, for the purpose of operating an alarm if apparatus does not function within a predetermined interval; or for measuring an exact number of impulses to be transmitted to a responsive device. In all telephone exchange systems low frequency alternating current generators are available for generating current at known frequencies such as 16⅔ cycles per second or 20 cycles per second. By providing a train of suitably designed relays of the type disclosed, for example, in Patent 1,561,951 granted to L. J. Stacy November 17, 1925, the relays of the train being alternately responsive to successive half waves of current from such a low frequency source, it becomes possible to count off periods of time of known duration, since the number of relays operated during any time interval is a direct measure of the time interval. For example, if the time interval to be measured is $x$, and the period of the source of current is 20 cycles per second, then the time interval for each half-cycle and the consequent operating time of each relay in the counting train will be 1/40th second and equating $x = N \times 1/40$, where N is the number of relays in the train which operate during the time interval. It is therefore the object of the present invention to provide a train of relays responsive to successive half waves from a source of alternating current, and particularly to provide such a relay train whereby time intervals may be accurately and easily measured without the employment of delicate measuring apparatus.

One embodiment of the invention, disclosed in the single sheet of drawings by way of illustration, shows a train of relays of the type disclosed in my patent hereinbefore referred to, arranged to be successively operated to test the releasing time of a relay. The relay testing apparatus disclosed herein, in which my invention has been embodied, has been made the specific subject matter of an application of Edmund B. Smith, Serial No. 202,278, filed June 29, 1927. As hereinbefore stated, however, the invention is not limited to such use but is applicable in other devices, for example, for counting the number of impulses to be transmitted from a sender to a responsive device in accordance with line designations registered therein, as disclosed in the application of W. C. Beach, Serial No. 197,620, filed May 6, 1927.

It is believed, however, that the invention will be best understood through a detailed description thereof in connection with the embodiment disclosed in the accompanying drawings. In the drawings a relay is disclosed at X, the releasing time of which is to be tested, this relay being suitably connected by testing clips or other means (not shown) to conductors 15, 16 and 17 extending to the relay test box. This box may be connected also by a suitable jumper connection 18 to a central station source of ringing current 19. The box contains among other equipment a plurality of control keys A, B, C and D; control relays 1, 2 and 20, a train of double wound differential relays 3 to 14 inclusive, so wound as to be successively responsive to successive half waves of current from the source 19, and a plurality of indicating lamps 21 to 30 inclusive, and 37.

It will be assumed that the test box has been connected to the relay X and to the source 19 and that the attendant to start the test has operated locking keys A and C. Upon the operation of key A an obvious circuit is closed for relays 1 and 2 over the lowermost contacts of key A, and circuits are also established through the upper winding of relay 3 and the uppermost contacts of key A, through the upper winding of relay 4 and the contacts 31 of key A, through the upper winding of relay 9 and the next to uppermost contacts of key A, and through the upper winding of relay 10 and the contacts 32 of key A.

Relay 1 when energized closes obvious circuits through the upper windings of relays 5, 6, 11 and 12, and similarly, relay 2 closes circuits through the upper windings of relays 7, 8, 13 and 14. Relays 3 to 14, inclusive, upon energizing all lock over their upper front contacts and through their upper windings to branches of conductor 33, which conductor was connected to ground upon the operation of key C.

It is to be noted at this point that relays 3 to 14 inclusive, are so wound that upon being energized and locked over their upper windings, they become successively and alternately polarized. For example, relay 3 becomes positively polarized, relay 4 becomes negatively polarized, relay 9 becomes positively polarized, etc. With the apparatus in this condition the non-locking key D is momentarily operated to energize relay X, which now locks over its front contact, conductor 15, the upper front contact of relay 4 to ground on conductor 33. At its lower back contact relay X removes battery from the winding of relay 20. Key A is now restored and locking key B is operated, the relays 1 and 2 thereupon releasing, but the remaining relays being held operated over their locking circuits and the contacts of key C.

Upon the operation of key B, the source of alternating current 19 is connected over conductor 18, the upper contacts of key B, conductor 34, resistance 35, conductor 36, and the lower front contact and lower winding of relay 3 to ground. Upon the first half wave of current from the source 19 of the proper polarity to establish a flux in the lower winding of relay 3 which will oppose the flux set up by the upper winding of relay 3, in the case assumed of positive polarity, relay 3 differentially releases connecting the source 19 over the circuit previously traced to conductor 36 and thence over the lower back contact of relay 3, the lower front contact and lower winding of relay 4 to ground. Since relay 4 has been assumed to have been negatively polarized by its upper winding, then upon the next succeeding half wave of negative current from the source 19 relay 4 becomes differentially released.

When relay 4 releases the locking circuit of relay X is opened at the upper contacts of relay 4 and relay X begins to release. The source of current 19 is now connected over the lower back contacts of relays 3 and 4 and the lower front contact of relay 5 to ground through the lower winding of relay 5, whereupon this latter relay differentially releases upon the next succeeding positive half wave from the source 19. In this manner successive relays of the train 6 to 14, inclusive, are differentially released by successive half waves of current of alternating polarity from the source 19, until the relay X has completely released.

Upon the complete release of relay X, however, a circuit is closed at its lower back contact extending over conductor 16 through the winding of relay 20 and the lower contacts of key B, whereupon relay 20 energizes, disconnecting at its back contact the source 19 from the train of relays 3 to 14 inclusive, to prevent the release of further relays of the train. At its front contact relay 20 closes the circuit of lamp 37, the lighting of which indicates that the test is completed.

The number of relays in the train which have released beginning with relay 5 is determined by the lapse of time from the moment that relay X started to release, when its holding circuit was opened by the release of relay 4, until the moment that relay 20 energized or in other words, until the moment the back contact of relay X closed, since the relay 20 being fast to operate does not introduce any time element which need be taken into consideration in the computation of the releasing time of the relay X. If, for example, six half waves have been transmitted from the source 19 between the release of relay 4 and the consequent start of the release of relay X and the complete release of relay X, the relays 5 to 10 inclusive, will have been released.

Each of these relays upon releasing closes a circuit for lighting a lamp signal, lamps 21 to 30 being assigned respectively to relays 5 to 14 inclusive and operative over the upper back contacts thereof. The number of lamps lighted will therefore indicate to the attendant the number of half waves which have occurred during the release of the relay X under test, and consequently, since the time period of a half wave of the source 19 is known, the time interval of such release is easily computed from the aforementioned equation.

After observing the lighting of lamp 37, and after making the necessary computation as above explained, the attendant restores the keys B and C to normal thereby releasing all relays of the test set that remain operated, and extinguishing all lighted lamps. The apparatus is then in condition for further tests.

While the invention has been illustrated and described in connection with a relay test box, it will be obvious as hereinbefore stated, that the invention has many other applications, and the appended claims, therefore, should not be construed as limited in their scope to apparatus of the character herein illustrated.

What is claimed is:

1. In combination, a train of relays, alternate ones of said relays being positively polarized and the remaining relays being negatively polarized, and means for impressing successive half waves of alternating current successively upon said relays whereby said relays become successively operated.

2. In combination, a train of relays, a polarizing winding for each of said relays, means for energizing said windings whereby alternate ones of said relays become positively polarized and the remaining relays become negatively polarized, a second winding on each of said relays, and means for impressing successive half waves of alternating current successively upon said second windings whereby said relays become successively operated.

3. In combination, a train of differentially wound relays, means for energizing and locking said relays over one winding of each, the energizing windings of said relays being so disposed that alternate relays of said train become positively polarized thereby, and the remaining relays become negatively polarized thereby, and means for impressing successive half waves of alternating current successively upon the other windings of said relays, whereby said relays become successively released.

4. In an apparatus for measuring an interval of time, a source of alternating current, a train of relays, alternate ones of said relays being positively polarized and the remaining relays being negatively polarized, and means for connecting said source successively to the relays of said train whereby said relays are successively operated by successive half waves of current from said source.

5. In an apparatus for measuring an interval of time, a source of alternating current, a train of differentially wound relays, means for energizing and locking said relays over one winding of each, the energizing windings of said relays being so disposed that alternate relays of said train become positively polarized thereby and the remaining relays become negatively polarized thereby, and means for connecting said source successively to the relays of said train whereby said relays are successively released by successive half waves of current from said source.

6. The method of measuring an interval of time consisting of oppositely and alternately polarizing a series of differential relays, connecting a source of alternating current successively to the idle windings of the relays to release them, and observing the number of relays which release during the time interval to be measured.

In witness whereof, I hereunto subscribe my name this 2d day of August, A. D. 1927.

LELAND J. STACY.